United States Patent [19]

Smith

[11] Patent Number: 5,442,737
[45] Date of Patent: Aug. 15, 1995

[54] SYSTEM AND METHOD FOR RENDERING A DISPLAY ON A COMPUTER SCREEN

[75] Inventor: Jeffrey H. Smith, Colorado Springs, Colo.

[73] Assignee: Hewlett-Packard Company, Palo Alto, Calif.

[21] Appl. No.: 791,810

[22] Filed: Nov. 13, 1991

[51] Int. Cl.⁶ ............................................. G06T 11/00
[52] U.S. Cl. ..................................... 395/135; 395/133
[58] Field of Search ............................... 395/133–136, 395/155, 161; 364/DIG. 1; 116/129 T

[56] References Cited

U.S. PATENT DOCUMENTS

| | | | |
|---|---|---|---|
| 4,027,620 | 6/1977 | Kirsch | 116/129 T |
| 4,849,880 | 7/1989 | Bhaskar et al. | 364/DIG. 1 |
| 4,954,970 | 9/1990 | Walker et al. | 395/135 |
| 5,093,798 | 3/1992 | Kita | 395/135 |
| 5,286,202 | 2/1994 | De Gyarfas et al. | 395/135 X |

*Primary Examiner*—Almis R. Jankus

[57] ABSTRACT

A computer-based system and method for simulating a gauge on a computer display screen and for displaying information in the gauge. According to the present invention, gauge elements are stored in multiple forms. The gauge is generated by overlaying the forms. The gauge is modified by modifying one or more of the gauge elements in the forms. Thus, the present invention minimizes computation time because the gauge may be modified without modifying all of the gauge elements. The gauge includes a background color, a scale, a shadow, a meter, and a needle. The background color and scale are stored in a scaleForm. The shadow is stored in a shadowForm. The meter is stored in a digitsForm.

14 Claims, 9 Drawing Sheets

SYSTEM AND METHOD FOR RENDERING A DISPLAY ON A COMPUTER SCREEN

CROSS-REFERENCE TO OTHER APPLICATIONS

The following application of common assignee contains some common disclosure with that of the present application:

STATISTICAL DASHBOARD DISPLAY (Ser. No. 07/790,921).

BACKGROUND OF THE INVENTION

1. Field Of The Invention

The present invention relates generally to computers. More particularly, the present invention relates to systems and methods for displaying information on computer displays.

2. Related Art

Measurement devices acquire and display information regarding objects under test. For example, protocol analyzers acquire and display information regarding communication networks.

Conventional measurement devices often display information in tables. Tables are advantageous in that they provide exact information regarding the object under test. In other words, tables provide a quantitative description of the object under test.

However, tables are limited for a number of reasons. First, tables do not provide a qualitative description of the object under test. Rather, operator experience, knowledge, and skill are required to convert the quantitative description of the object under test (provided by the tables) to a qualitative description of the object under test.

Second, operators may easily read the information in tables only when the operators are close to the measurement devices which are displaying the tables. In other words, information in tables are not visible from across a room.

SUMMARY OF THE INVENTION

The present invention is directed to a computer-based system and method for simulating a gauge on a computer display screen and for displaying information in the gauge.

According to the present invention, gauge elements are stored in multiple forms. The gauge is generated by overlaying the forms. The gauge is modified by modifying one or more of the gauge elements in the forms. Thus, the present invention minimizes computation time because the gauge may be modified without modifying all the gauge elements.

The gauge includes a background color, a scale, a shadow, a meter, and a needle. The background color and scale are stored in a scaleForm. The shadow is stored in a shadowForm. The meter is stored in a digitsForm.

The gauge is modified as follows. First, new data is received. Second, it is determined whether the new data falls in an unacceptable zone of the scale. If the new data falls in the unacceptable zone, then the background color in the scaleForm is modified to indicate the unacceptable zone.

Third, it is determined whether the new data falls outside a region of the scale defined by the shadow. If the new data falls outside this region, then the shadow in the shadowForm is modified to include the new data.

Fourth, it is determined whether the new data and an accumulated value in the meter are equal. If the new data and the accumulated value are not equal, then the accumulated value is replaced with the new data in the digitsForm.

The forms are overlayed as follows. First, the scaleForm and shadowForm are logically AND'ed. The result of the logical AND is stored in a gaugeForm. Second, the needle is drawn in the gaugeForm. Third, pixels of the digitsForm are written over corresponding pixels of the gaugeForm.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

1. General Operation and Structure

Figure 2A:
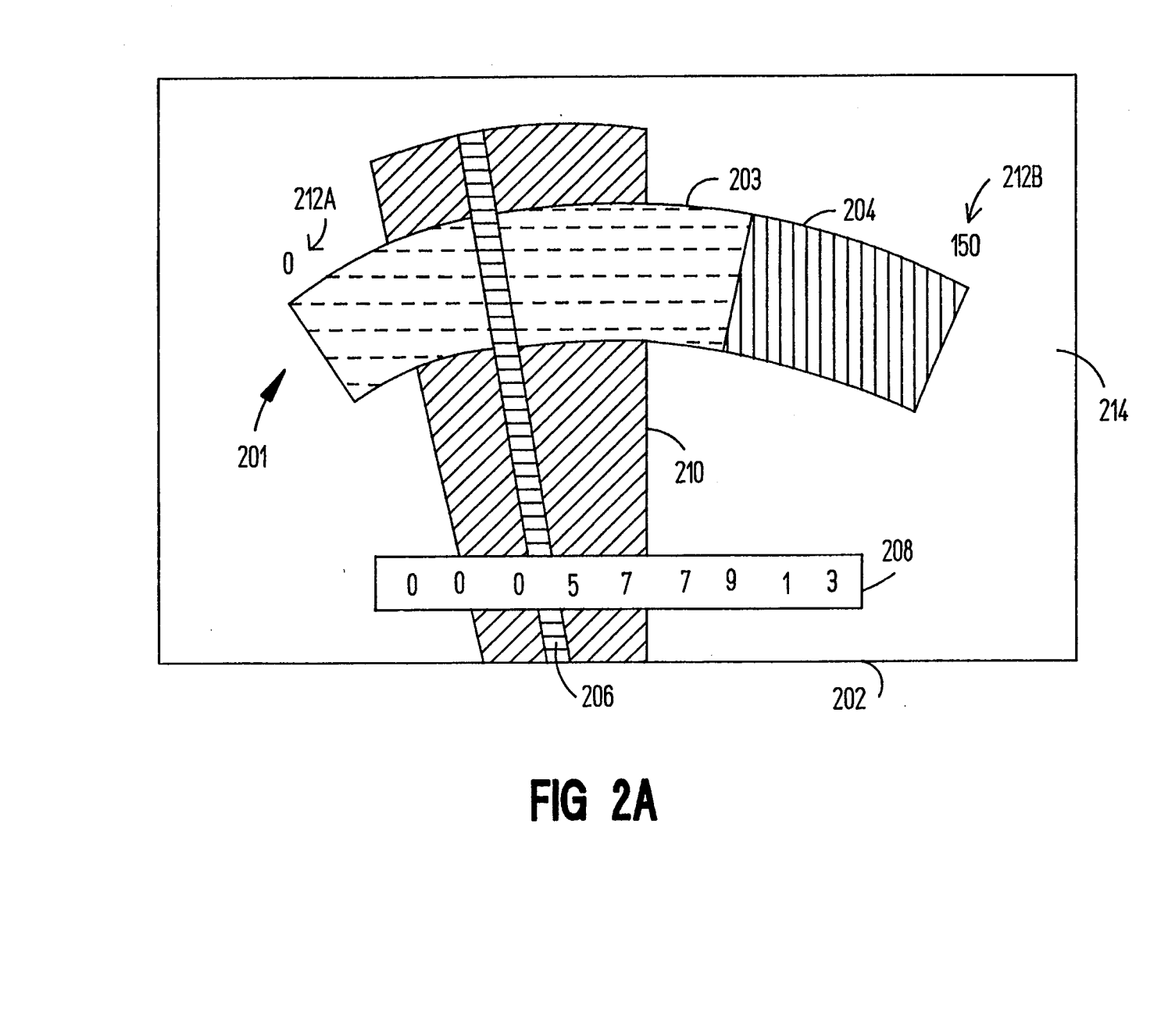
FIG. 2A illustrates an example of a gauge which is simulated by the present invention.
Figure 2B:
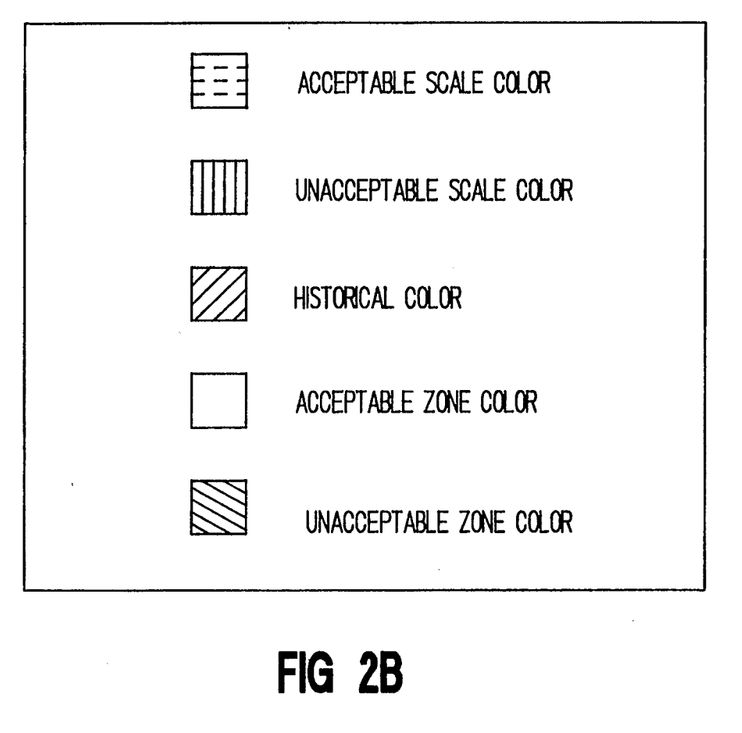
FIG. 2B illustrates a legend of colors found in a gauge.

As stated above, the present invention simulates a gauge on a computer screen. The present invention also displays information in the gauge. FIG. 2A illustrates an example of a gauge 202 which is simulated by the present invention. FIG. 2B illustrates a legend of colors found in the gauge 202.

The gauge 202 includes a scale 201, a needle 206, a meter 208, a shadow 210, and a background color 214.

The scale 201 has an acceptable zone 203 which is identified by an acceptable scale color, such as green. The scale 201 also has an unacceptable zone 204 which is identified by an unacceptable scale color, such as red. Scale digits 212 identify the end points of the scale 201.

The needle 206 indicates a current value of a quantity being monitored. For example, the quantity being monitored may be the error rate of a local area network (LAN). According to this example, the needle would indicate the current error rate of the LAN.

The meter 208 displays an accumulated value of the quantity being monitored. According to the current example, the meter 208 would display the total number of errors of the LAN.

The shadow 210 shows the historical minimum and maximum values of the quantity being monitored.

The background color 214 indicates whether the needle 206 has ever been in the unacceptable zone 204 of the scale 201. If the needle 206 has never been in the unacceptable zone 204, then the background color 214 is set to an acceptable zone color (such as white). This is the status in FIG. 2A. However, if the needle 206 has ever been in the unacceptable zone 204, then the background color 214 is set to an unacceptable zone color (such as pink).

The gauge 201 is displayed on a computer display screen. According to the preferred embodiment of the present invention, the gauge 201 is displayed in a window.

Figure 1:
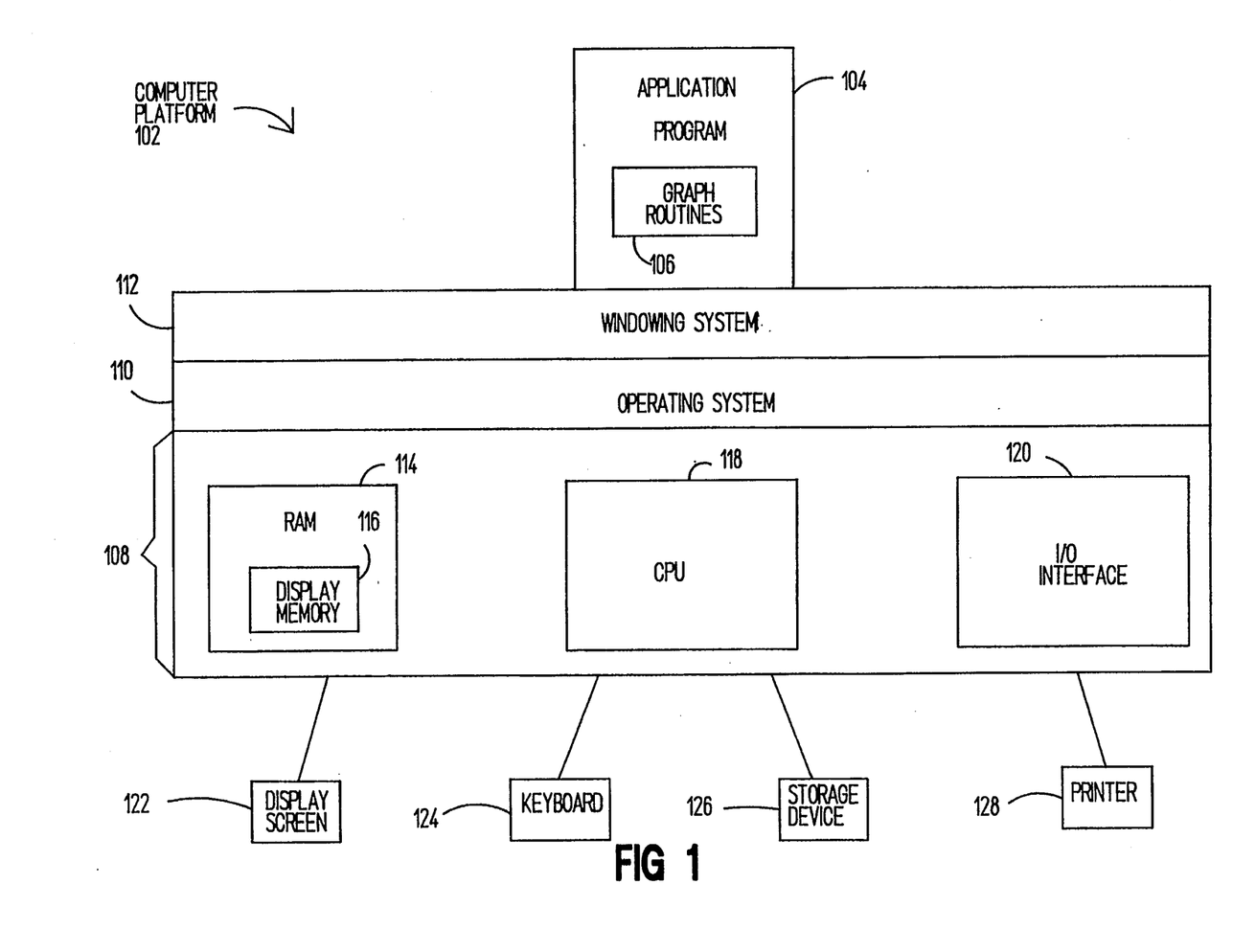
FIG. 1 illustrates a computer platform in which the present invention operates.

FIG. 1 illustrates a computer platform 102 in which the present invention operates.

The computer platform 102 has hardware components 108. The hardware components 108 include a random access memory (RAM) 114, a central processing unit 118, and an input/output (I/O) interface 120. The RAM 114 includes a display memory 116.

The computer platform 102 has an operating system 110 and a windowing system 112. Operating on the computer platform 102 is an application program 104.

The application program 104 includes graph routines 106. According to a preferred embodiment, the graph routines 106 represent the present invention. The graph routines 106 may be part of a software library that has been linked into the application program 104.

The computer platform 102 includes various peripherals, such as a display screen 122, a keyboard 124, a storage device 126, and a printer 128.

In the preferred embodiment of the present invention, the computer platform 102 is an International Business Machines (IBM) compatible personal computer. The windowing system 112 is Smalltalk V.

The graph routines 106 of the present invention include (1) a build gauge routine, (2) an update gauge routine, and (3) an initialize gauge routine. The build gauge routine simulates the gauge 202 on the display screen 122. The update gauge routine displays data in the gauge 202. The initialize gauge routine clears the gauge 202.

Figure 4:
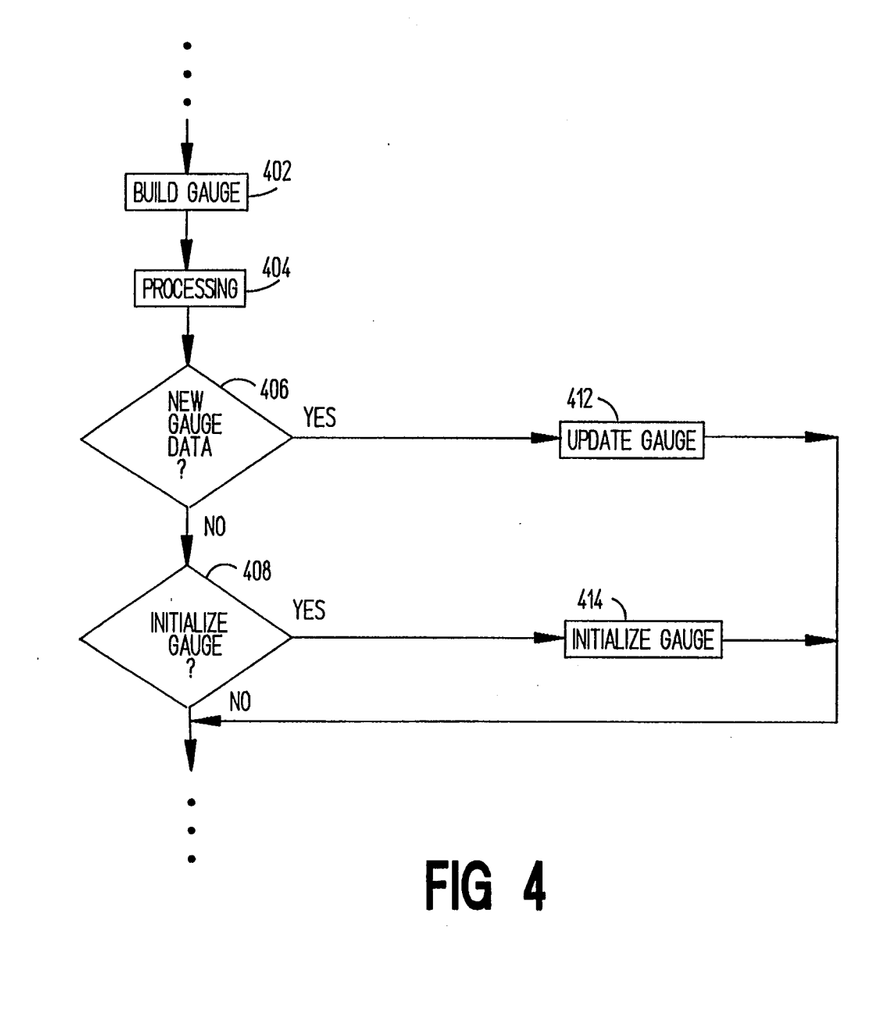
FIG. 4 illustrates a partial flowchart of an application program which uses the present invention to simulate and display data in a gauge.

FIG. 4 illustrates a partial flowchart of an application program 104 which uses the graph routines 106 of the present invention to simulate and display data in a gauge 202.

In step 402, the application program 104 calls the build gauge routine of the present invention. The build gauge routine simulates the gauge 202 on the display screen 122. Note that the application program 104 may have provided the windowing system 112 with the name of the build gauge routine. The windowing system 112 may then have caused the application program 104 to invoke the build gauge routine (by passing the name of the build gauge routine to the application program 104).

In step 404, the application program 104 performs some application-specific processing.

In step 406, if the application-specific processing produced data to be displayed in the gauge 202, then the application program 104 executes step 412. In step 412, the application program 104 calls the update gauge routine to display the data in the gauge 202. Following step 412, the application program 104 may loop back to step 404.

In step 408, if the application-specific processing did not produce a request to initialize the gauge 202, then the application program 104 continues in a manner which is application-specific (and which is not specified in FIG. 4). The application program 104, for example, may loop back to step 404.

In step 408, if the application-specific processing produced a request to initialize the gauge 202, then the application program 104 executes step 414. In step 414, the application program 104 calls the initialize gauge routine to initialize the gauge 202. The request to initialize the gauge 202 may have come from an operator. Following step 414, the application program 104 may loop back to step 404.

The build gauge routine, update gauge routine, and initialize gauge routine are described further in the following sections.

2. Build Gauge Routine

According to the present invention, a gauge 202 is generated as follows. First, pixel patterns are written on several forms. Second, the forms are combined.

The manner in which the forms are combined to generate the gauge 202 is similar to the manner in which transparencies are overlayed to generate an image using an overhead projector.

Forms are well known to those with ordinary skill in the art of windowing systems.

The following global variables must be specified by the application program 104 which is using the graphing routines 106 of the present invention.

First, Dn must be specified. Dn is the number of digits in the meter 208. If Dn is zero, then the graphing routines 106 will not display the meter 208.

Second, Sl must be specified. Sl is the scale digit 212A at the left end of the scale 201. Sl is usually set to zero.

Third, Sr must be specified. Sr is the scale digit 212B at the right end of the scale 201. The range of data values which can be displayed by the gauge 202 is Sl through Sr.

Fourth, Rl must be specified. Rl is the leftmost part of the unacceptable zone 204 on the gauge scale 201. Thus, if Sl=0, Sr=10, Rr=10, and Rl=7, the leftmost 70% of the scale 201 will be acceptable and the remaining 30% of the scale 201 will be unacceptable (the left end of the unacceptable zone 204 is at the 70% point). In this example, the entire scale 201 will be acceptable if Rl>=Sr.

Fifth, Rr must be specified. Rr is the rightmost part of the unacceptable zone 204 on the gauge scale 201. Thus, if Sl=0, Sr=10, Rl=0, and Rr=7, the leftmost 70% of the scale 201 will be the unacceptable zone 204 and the remaining 30% of the scale 201 will the acceptable zone 203 (the right end of the unacceptable zone 204 is at the 70% point). In this example, the entire scale will be unacceptable if Rr>=Sr.

Rr and Rl may be used in combination. If Sl=0, Sr=10, Rl=2, and Rr=7, then the leftmost 20% of the scale 201 and the rightmost 30% of the scale 201 will be acceptable and the remainder of the scale 201 will be unacceptable. If Sl=0, Sr=10, Rl=7, and Rr=2, the left most 20% of the scale 201 and the rightmost 30% of the scale 201 will be unacceptable and the remainder of the scale 201 will be acceptable.

Sixth, N must be specified. N is the data value which determines the position of the needle 206. N is usually zero for initialization.

Seventh, D must be specified. D is the current reading of the meter 208. D is usually zero for initialization.

Figure 5:
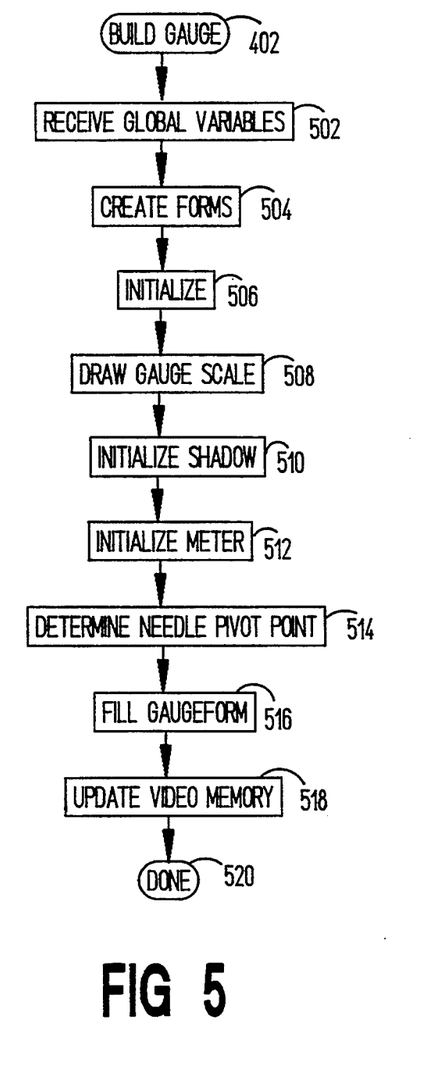
FIG. 5 illustrates a flowchart for a build gauge routine of the present invention.

FIG. 5 illustrates a flowchart for the build gauge routine 402 of the present invention.

In step 502, the build gauge routine 402 receives the global variables (described above) from the application program 104.

In step 504, the build gauge routine 402 creates a scaleForm 302, shadowForm 304, digitsForm 306, and gaugeForm. These forms are initialized in the following steps. These forms cannot be initialized until the size of the gauge 202 is known.

In step 506, the build gauge routine 402 initializes the following local variables.

First, currentReading is initialized. currentReading represents the current position of the needle 206. currentReading is initialized to N.

Second, minReading is initialized. rainReading represents the leftmost position reached by the needle 206 and therefore the leftmost edge of the shadow 210. minReading is initialized to N.

Third, maxReading is initialized. maxReading represents the rightmost position reached by the needle 206 and therefore the rightmost edge of the shadow 210. maxReading is initialized to N.

Fourth, currentDigits is initialized. currentDigits represents the current reading of the meter 208. currentDigits is initialized to D.

Various other local variables are initialized at this point, such as a local variable for turning on or off the shadow 210, a local variable for turning on or off the meter 208, a local variable for turning on or off the scale digits 212, and local variables for setting the colors of the gauge 202. For illustrative purposes, we shall assume that these local variables are set such that the shadow 210, the meter 208, and the scale digits 212 are displayed.

Also in step 506, the build gauge routine 402 determines the size of the gauge 202 in pixels. The size of the gauge 202 is provided by the windowing system 112. The size of the gauge 202 is specified by X and Y, where X is the horizontal width of the gauge 202 in pixels and Y is the vertical height of the gauge 202 in pixels.

Figure 3A:
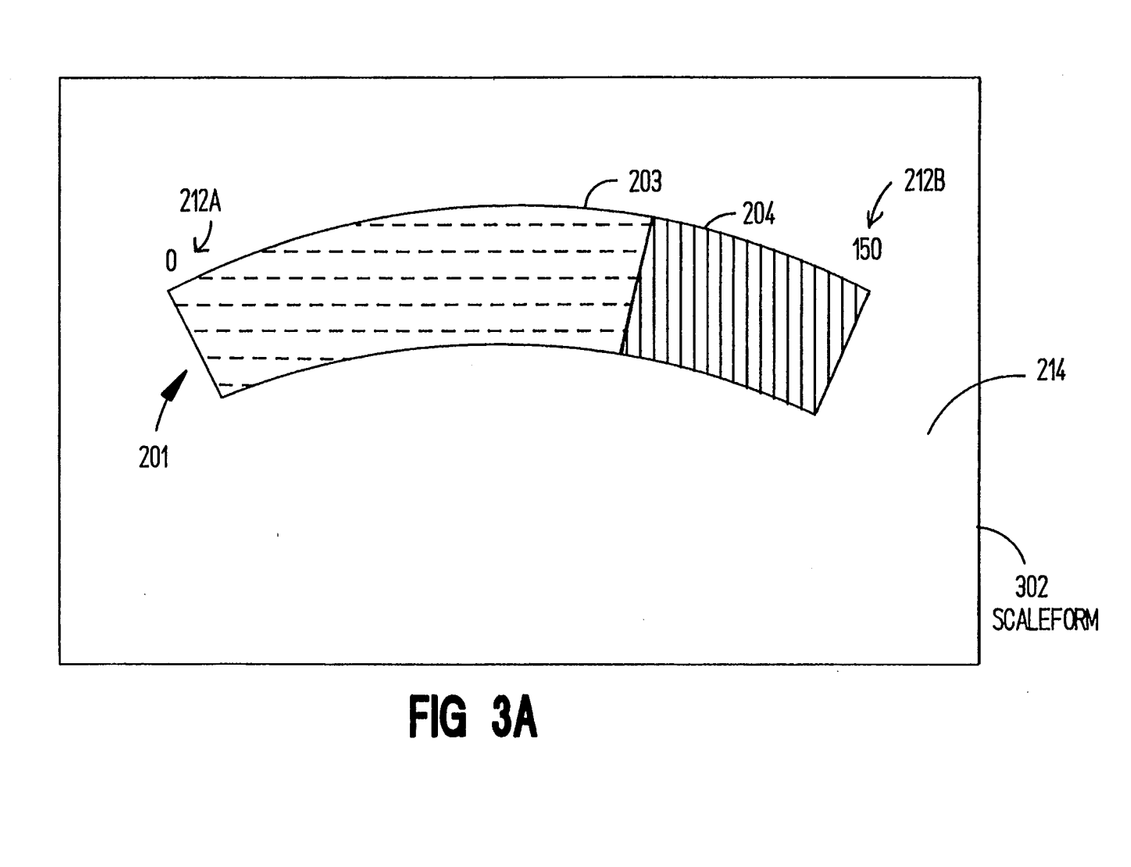
FIG. 3A illustrates an example of a scaleForm.

In step 508, the build gauge routine 402 draws the scale 201 and the scale digits 212 on the scaleForm 302. The build gauge routine 402 also sets the background color 214. The build gauge routine 402 uses the values of currentReading, Sl, Sr, Rl, and Rr to determine the scale colors and the background color 214. The size of the scaleForm 302 is X by Y pixels. The offset of the scaleForm 302 is 0. FIG. 3A illustrates an example of the scaleForm 302.

Figure 3B:
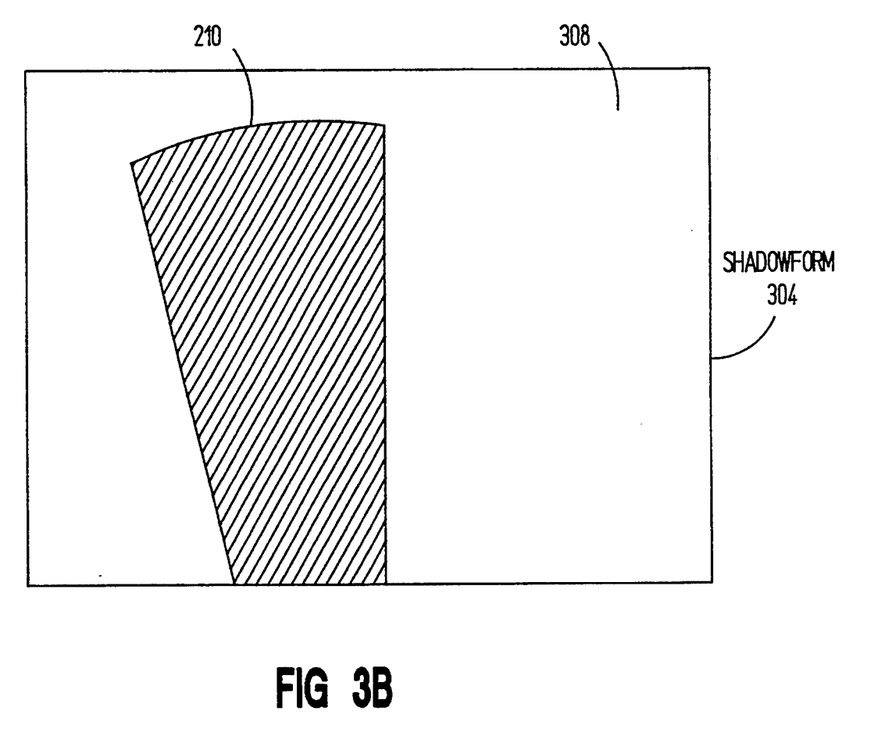
FIG. 3B illustrates an example of a shadowForm.

In step 5 10, the build gauge routine 402 initializes the shadowForm 304 to X by Y pixels. The shadowForm 304 contains the shadow 210. The build gauge routine 402 clears the shadowForm 304 because the needle 206 has not yet moved. The offset of the shadowForm 304 is zero. FIG. 3B illustrates an example of the shadowForm 304 where the needle 206 has moved.

Figure 3C:
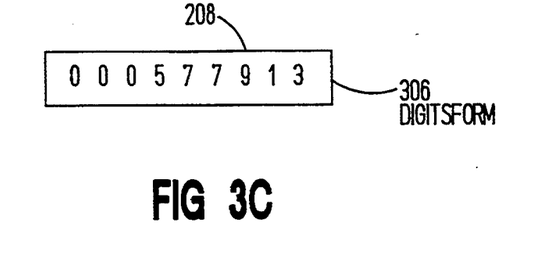
FIG. 3C illustrates an example of a digitsForm.

In step 512, the build gauge routine 402 initializes the digitsForm 306. The digitsForm 306 only contains the meter 208. Thus, the size of the digitsForm 306 is determined by the number of digits to be displayed. The build gauge routine 402 writes the digits corresponding to D on the digitsForm 306. The build gauge routine 402 uses X and Y to determine the offset of the digitsForm 306. Specifically, the offset is a percentage film the top of the scaleForm 302. The value of the percentage is implementation dependent. FIG. 3C illustrates an example of the digitsForm 306. Note that the legend in FIG. 2B applies to FIGS. 3A, 3B, and 3C.

In step 514, the build gauge routine 402 uses X and Y to compute and save the pivot point of the needle 206. In the preferred embodiment of the present invention, the pivot point is below the gauge 202 (approximately 3 times Y below the gauge 202) for aesthetic purposes. The build gauge routine 402 also computes the positions of the tip of the needle 206 at 0%, 1%, 2%, ..., 100% of full scale. These positions are saved in an 101-element array.

These points are pre-computed in order to save computation time when the gauge 202 is updated. When either the needle 206 or the shadow 210 are drawn, any required positions are converted to the nearest integer percent of full scale and the stored pixel locations are used.

In step 516, the build gauge routine 402 fills the gaugeForm by combining the contents of the scaleForm 302, shadowForm 304, and digitsForm 306 and by drawing the needle 206.

Specifically, the build gauge routine 402 first performs a logical-AND operation with the contents of the scaleForm 302 and the shadowForm 304. The result of this logical-AND operation is placed in the gaugeForm.

The shadowForm 304 contains a background 308 which is defined such that the logical-AND between the background 308 and the scaleForm 302 yields the contents of the scaleForm 302. In other words, the pixels in the background 308 are essentially logical "1"s. The pixels in the shadow 210 are not logical "1"s. Thus, the logical-ANDing of the shadow 210 and the scaleForm 302 produces a darkened area in the gaugeForm corresponding to the shadow 210.

Second, the build gauge routine 402 draws the needle 206 on the gaugeForm.

Third, the build gauge routine 402 overlays the digitsForm 306 on to the gaugeForm such that the pixels of the digitsForm 306 replaces the corresponding pixels of the gaugeForm.

Following step 516, the gaugeForm is complete. The gaugeForm is the only form known to the windowing system 112. The gaugeForm holds the pixel pattern which is to be displayed when the windowing system 112 updates the gauge 202.

In step 518, video memory is updated by displaying the gaugeForm built in the previous steps. This is usually done by executing windowing system code.

Note that, by maintaining the gauge 202 in multiple forms, the present invention reduces the computational time necessary to update the gauge 202. For example, to update the gauge 202, usually only the needle 206 and the meter 208 need to be changed. Thus, it is not necessary to modify the scale 201, scale digits 212, and background color 214 in the scaleForm 302. Also, it is not necessary to modify the shadow 210 in the shadowForm 304 (this is particularly true once the quantity to be monitored has settled). Rather, only the meter 208 in the digitsForm 306 and the needle 206 in the gaugeForm need to be modified.

Although described herein with regard to a gauge 202, the present invention is applicable to any computer-simulated display wherein elements of the computer-simulated display are stored in multiple forms, and the computer-simulated display is formed by overlaying the multiple forms.

3. Update Gauge Routine

Figure 6:
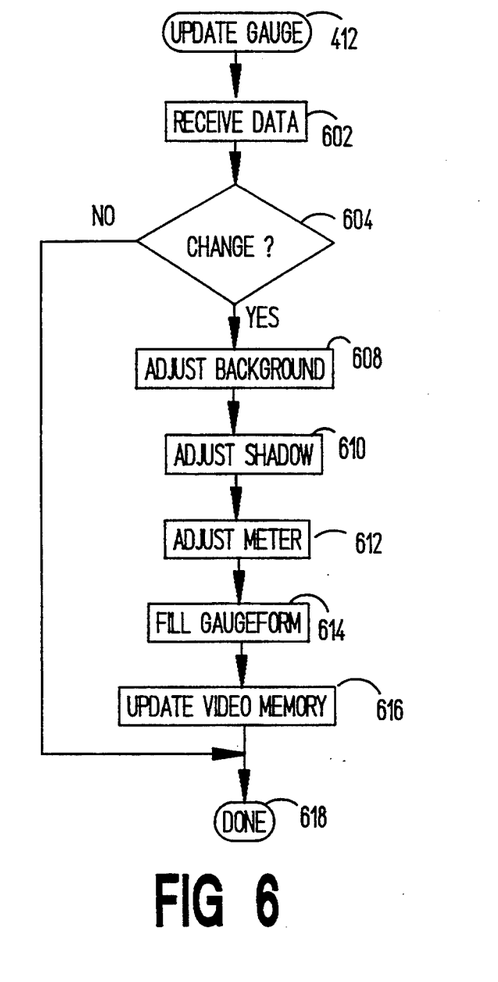
FIG. 6 illustrates a flowchart for an update gauge routine of the present invention.

FIG. 6 illustrates a flowchart for the update gauge routine 412 of the present invention.

In step 602, the update gauge routine 412 receives new values of N and D.

In step 604, the update gauge routine 412 determines whether N equals currentReading and D equals currentDigits. If N equals currentReading and D equals currentDigits, then the update gauge routine 412 exits since the gauge 202 need not be updated.

If N does not equal currentReading and/or D does not equal currentDigits, then the update gauge routine 412 moves to step 606.

In step 608, the update gauge routine 412 determines whether the value of N places the needle 206 over the unacceptable zone 204 of the scale 201. If the value of N places the needle 206 over the unacceptable zone 204, and if the background color 214 of the scaleForm 302 is not already set to the unacceptable zone color, then the update gauge routine redraws the scaleForm 302 with the unacceptable zone color as the background color 214.

In step 610, the update gauge routine 412 sets currentReading equal to N. Then, the update gauge routine 412 determines whether currentReading is less than rainReading or whether currentReading is greater than maxReading. If either currentReading is less than minReading or currentReading is greater than maxReading, then the update gauge routine 412 updates the shadow 210 by first updating minReading or maxReading. Then, the update gauge routine 412 redraws the shadowForm 304 using the values of minReading and maxReading to determine the limits of the shadow 210.

In step 612, the update gauge routine 412 determines whether currentDigits is equal to D. If currentDigits is not equal to D, then the update gauge routine updates the digitsForm 306 to display D. If the integer value of D has more than Dn digits, then the update gauge routine 412 displays all '9' digits in the meter 208. In step 612, the update gauge routine 412 also sets currentDigits equal to D.

In step 614, the update gauge routine 412 fills the gaugeForm by combining the contents of the scaleForm 302, shadowForm 304, and digitsForm 306 and by drawing the needle 206. Step 614 is similar to step 516.

In step 616, the video memory is updated by displaying the gaugeFonn built in the previous steps. Step 616 is similar to step 518.

4. Initialize Gauge Routine

Initializing a gauge 201 is usually initiated by an operator, although it could be done under program control. It is assumed that the windowing system 112 gives the operator some way to indicate a desire to clear the gauge 201 and also to provide default values for the global variables (discussed above).

Figure 7:
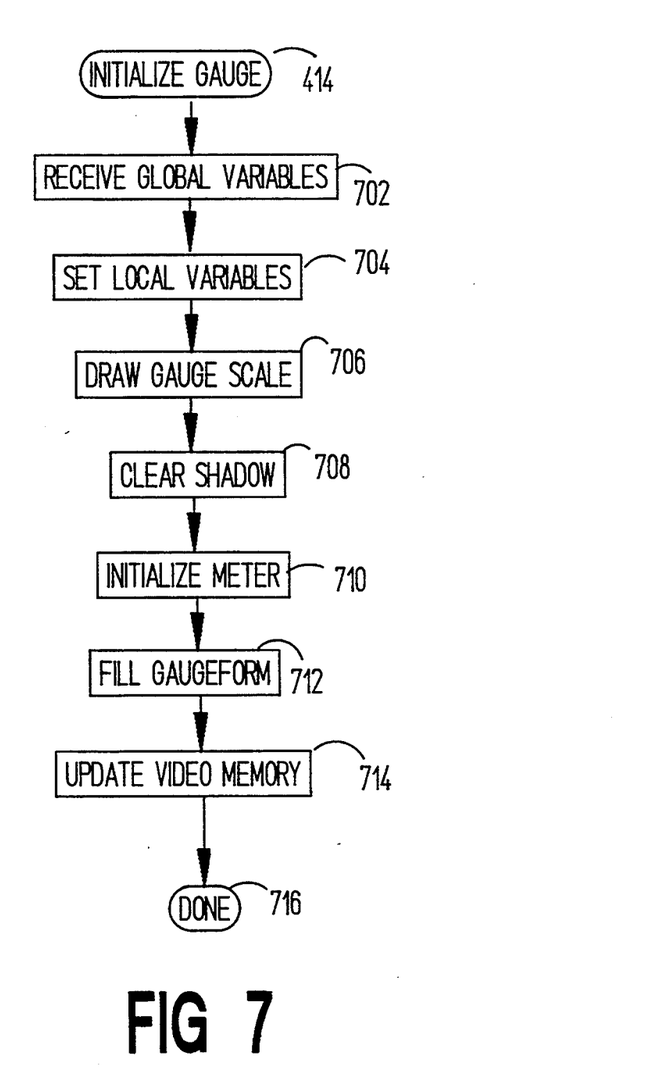
FIG. 7 illustrates a flowchart for an initialize gauge routine of the present invention.

FIG. 7 illustrates a flowchart for the initialize gauge routine 414 of the present invention.

In step 702, the initialize gauge routine 414 receives the global variables.

In step 704, the initialize gauge routine 414 sets the local variables as follows. currentReading is set to N. minReading is set to N. maxReading is set to N. currentDigits is set to D.

In step 706, the initialize gauge routine 414 repaints the scaleForm 302. The background color 214 is set to the unacceptable zone color if the value of N places the needle 206 in the unacceptable zone 204 of the scale 201.

In step 708, the initialize gauge routine 414 clears the shadowForm 304.

In step 710, the initialize gauge routine 414 updates the digitsForm such that the meter 208 displays D.

In step 712, the initialize gauge routine 414 fills the gaugeForm by combining the contents of the scaleForm 302, shadowForm 304, and digitsForm 306 and by drawing the needle 206. Step 712 is similar to step 516.

In step 714, the video memory is updated by displaying the gaugeForm built in the previous steps. Step 714 is similar to step 518.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for rendering a display of an image on a computer screen, the displayed image comprising a plurality of elements, the method comprising the steps of:
   (a) creating a plurality of forms;
   (b) writing each of the plurality of elements in a respective one of said plurality of forms such that the displayed image is maintained in said plurality of forms, including the steps of,
      (1) writing, in a first form, a background color and a scale having an acceptable zone and an unacceptable zone,
      (2) writing, in a second form, a needle shadow, and
      (3) writing, in a third form, a meter having an accumulated value;
   (c) modifying only those elements that need to be changed and writing said modified elements to said respective forms such that only those forms comprising said modified elements are updated;
   (d) combining the contents of said plurality of forms to result in a final combined form, including the steps of
      (1) logically AND'ing said first and second form to produce an intermediate form,
      (2) writing a needle in said intermediate form, and
      (3) writing, into said intermediate form, pixels of said third form over corresponding pixels of said intermediate form; and
   (e) displaying said final combined form on the computer screen to display the displayed image, wherein the displayed image appears as an overlayed display of each of the plurality of elements contained in said final combined form.

2. The method of claim 1, wherein said step (c) comprises the steps of:
   (1) receiving new data;
   (2) determining whether said new data falls in said unacceptable zone; and
   (3) modifying said background color in said first form to indicate said unacceptable zone when said new data falls in said unacceptable zone.

3. The method of claim 2, wherein said step (c) further comprises the steps of:

(4) determining whether said new data falls outside a region of said scale defined by said needle shadow; and (5) modifying said needle shadow in said second form to include said new data when said new dam falls outside said region.

4. The method of claim 2, wherein said step (c) further comprises the steps of:

(6) determining whether said new data and accumulated value are equal; and (7) replacing said accumulated value with said new data in said third form when said new data and accumulated value are not equal.

5. The method of claim 1, wherein said step (e) comprises the step of copying said intermediate form to video memory.

6. The method of claim 1, wherein the displayed image comprises a gauge.

7. A method for displaying information on a computer screen, wherein the information is stored in a plurality of forms, said method comprising the steps of:

(a) writing a background color in a first of the plurality of forms;

(b) writing a scale having an acceptable zone and an unacceptable zone in said first form;

(c) writing a needle and a needle shadow in a second of the plurality of forms;

(d) writing a meter having an accumulated value in a third of the plurality of forms;

(e) combining said first, second, and third forms to result in a final combined form to generate a gauge display (1) logically AND'ing said first, second, and third forms to produce an intermediate form, and (2) writing, into said intermediate form, pixels of said third form over corresponding pixels of said intermediate form; and (f) displaying said final combined form on the computer screen, wherein the display of said final combined form comprises an overlayed image of said information stored in said first, second, and third forms.

8. The method of claim 7, further comprising the step of:

(g) modifying said gauge display by modifying one or more of said plurality of forms.

9. The method of claim 8, wherein said step (g) comprises the steps of:

(1) receiving new data;

(2) determining whether said new data falls in said unacceptable zone; and (3) modifying said background color in said first form to indicate said unacceptable zone when said new data falls in said unacceptable zone.

10. The method of claim 9, wherein said step (g) further comprises the steps of:

(4) determining whether said new data falls outside a region of said scale defined by said needle shadow; and (5) modifying said needle shadow in said second form to include said new data when said new data falls outside said region.

11. The method of claim 9, wherein said step (g) further comprises the step of:

(6) determining whether said new data and accumulated value are equal; and (7) replacing said accumulated value with said new dam in said third form when said new data and said accumulated value are not equal.

12. A system for rendering a gauge display on a computer screen, the gauge display comprising a plurality of elements, said system comprising:

storing means for storing each of the plurality of elements in a respective one of a plurality of forms located in a memory form creation means for creating a first form, a second form, and a third form, first drawing means for drawing, in said first form, a background color and a scale having an acceptable zone and an unacceptable zone, second drawing means for drawing, in said second form, a needle shadow, and third drawing means for drawing, in said third form, a meter having an accumulated value;

modifying means for modifying only those elements that need to be changed and writing said modified elements to said respective form, such that only those forms comprising said modified elements are updated;

combining means for combining the contents of said plurality of forms to result in a final combined form, the elements of said final combined form being overlayed in the display; and display means for displaying said overlayed form on the computer screen.

13. The system of claim 12, wherein said modifying means comprises:

data receiving means for receiving new data;

first means for determining whether said new data falls in said unacceptable zone;

second modifying means for modifying said background color in said first form to indicate said unacceptable zone when said new data falls in said unacceptable zone;

second means for determining whether said new data falls outside a region of said scale defined by said needle shadow;

third modifying means for modifying said needle shadow in said second form to include said new data when said new data falls outside said region;

third means for determining whether said new data and accumulated value are equal; and fourth means for replacing said accumulated value with said new data in said third form when said new data and accumulated value are not equal.

14. The system of claim 12, wherein said combining means comprises:

fifth means for logically AND'ing said first and second forms to produce an intermediate form;

fourth drawing means for drawing a needle in said intermediate form; and second storing means for writing, into said intermediate form, pixels of said third form over corresponding pixels of said intermediate form.

* * * * *